Sept. 29, 1942.   C. M. OSTERHELD   2,297,016

WATER HEATER CONTROL SYSTEM

Filed May 19, 1941

INVENTOR.
CLARK M OSTERHELD
BY
*H. M. Biebel*
ATTORNEY

Patented Sept. 29, 1942

2,297,016

UNITED STATES PATENT OFFICE 2,297,016

WATER HEATER CONTROL SYSTEM

Clark M. Osterheld, Stoughton, Wis., assignor to McGraw Electric Company, Elgin, Ill., a corporation of Delaware Application May 19, 1941, Serial No. 394,229

7 Claims. (Cl. 219—39)

My invention relates to electric control systems and particularly to water heater control systems.

An object of my invention is to provide a thermostatic control means associated with a hot water tank that will reduce the number of cycles of heating.

Another object of my invention is to provide thermal means for controlling the energization of the heater of a hot water tank that will permit of withdrawing a relatively large amount of hot water from the tank, when substantially all of the water has been heated and the heater has been deenergized, before the heater is reenergized.

Other objects of my invention will either be apparent from a description of one form of system and device embodying my invention or will be pointed out in the course of such description and set forth in the appended claims.

Figure 1:
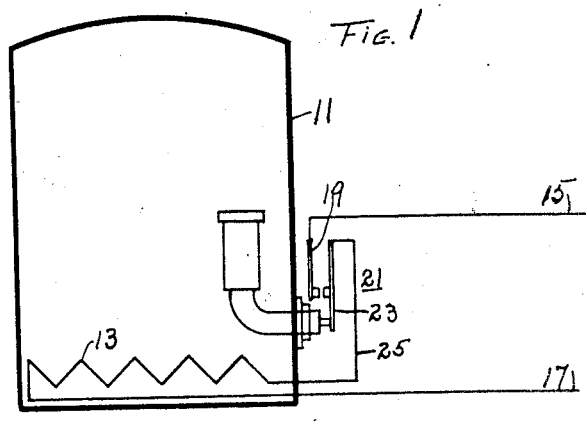
Figure 2:
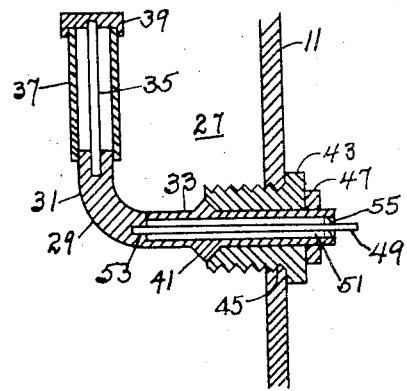

In the single sheet of drawings:

Figure 1 is a diagrammatic view of a system of heater control embodying my invention as applied to a hot water tank, and, Fig. 2 is a vertical sectional view taken through the thermal control means shown generally only in Fig. 1 of the drawing.

It is sometimes found advantageous, by central stations supplying current to relatively large urban and suburban territories, to provide a relatively small hot water storage tank having associated therewith a single electric heater of relatively high wattage. One of the attendant phases of economy obtained by the use of a relatively small storage tank is not only in the first cost of the installation but also the lower heat radiating surface and therefore the smaller degree of heat radiation and attendant temperature drop of the hot water in case the tank is full of hot water which is not being used.

One of the attendant disadvantages of using a single thermal heater control switch subject either to the temperature of the tank at one given point or subject to the temperature of the water in the tank at one given point is that if the heater and its associated thermal control switch are mounted in or on the tank adjacent the lower end thereof, the open thermal heater control switch will be caused to reclose in case a relatively small amount of hot water is withdrawn from the tank, thereby causing a relatively large number of heating cycles in case of withdrawals of small quantities of hot water from the tank, with attendant radio interference.

Referring first to Fig. 1 of the drawing, I have there shown generally only a hot water tank 11 which may be relatively smaller than the ordinary hot water tank installed in homes and which may have associated therewith an electric heater 13 which is so designed and constructed as to have a higher wattage capacity than the heaters ordinarily used in such installations. For illustrative purposes only, I may use a twenty gallon or thirty gallon tank instead of a forty or a sixty gallon tank and I may use a 3000 watt or even larger electric heater instead of a 1000 watt or a 1500 watt heater. As hereinbefore stated, these figures are illustrative only and are not to be considered as limiting my invention.

The usual cold water inlet pipe and hot water outlet pipe, heat insulation and supporting means for the tank 11 are to be considered as being provided but as they constitute no part of my invention they are not shown in detail in the drawing.

A pair of supply circuit conductors 15 and 17 may be connected with the incoming supply circuit conductors connected to the generating equipment at the central station. Supply circuit conductor 15 may be connected to a fixed contact member 19 or to a substantially rigid contact arm 19 of a thermal switch 21, which includes a second contact arm 23 normally yieldingly biased into engagement with the substantially rigid contact arm 19. While Fig. 1 of the drawing does not show the support or mounting for the switch, this forms no part of my invention and suitable supporting means are to be considered as being provided. Contact arm 23 is connected by a conductor 25 with one terminal of the heater 13, the other terminal of which is connected to the other supply circuit conductor 17.

I provide a thermally actuable controller designated generally by numeral 27 and shown schematically only in Fig. 1 of the drawing but I have illustrated one form of such device embodying my invention on an enlarged scale in Fig. 2 of the drawing.

I provide a good heat conducting member 29 which may, for instance, be made of brass, and which is of substantially L-shape having a shorter arm 31 and a longer arm 33. This latter arm 33 is adapted to extend through an opening in the wall of tank 11 near the bottom thereof and held in such position by means to be hereinafter described. The arm 31 is provided with a bore therein adapted to receive the lower end of a heat conducting rod 35 which may also be of brass and which may have a relatively tight fit in the opening or bore in arm 31. I provide a tubular member 37 the lower end of which has either screw threaded engagement with the upper end of arm 31 or is brazed or soldered thereto to make a fluid-tight joint. A cap 39 of good heat conducting material may have fluid-tight engagement with the upper end of tubular member 37 and is adapted to receive the upper end portion of rod 35 in a good heat-conducting manner as by having a bore therein into which the upper end of heat-conducting rod 35 may fit relatively tightly.

The mid portion of arm 33 of member 29 is provided with an annular collar 41 which is adapted to fit into the inner end of a bushing 43 which is adapted to have screw threaded engagement with an opening 45 in the tank wall 11. A lock nut 47 may have screw threaded engagement with the outer end portion of arm 33 so that when nut 47 is screwed tightly up against the outer end of bushing 43, the annular collar 41 will be moved into close engagement with the correspondingly shaped inner end of bushing 43 to obtain a fluid-tight joint.

An expansion rod 49 is adapted to be held in an opening 51 extending from the outer end of arm 33 to substantially the junction of arms 33 and 31. I may provide a small bore 53 in the central portion of member 29 to receive the inner end of expansion rod 49 and I may provide a bushing 55 immediately adjacent and inside of the outer end of arm 33 to properly support expansion rod 49 in the bore 51.

While I have mentioned that the member 29 may be made of brass, I do not desire to be limited thereto since it may be made of other metals or alloys and I may make the expansion rod 49 of aluminum or a high expansion brass. The tubular member 37 is preferably made of a metal or of an alloy having a relatively high thermal resistance to the transmission of heat and I may make member 39 of a material such as brass which will receive and conduct the heat of the ambient water.

Let it be assumed that the heater 13 had been energized for a sufficient length of time to cause all or substantially all of the water in the tank to have become hot with the result that the expansion of rod 49 to the position shown in Fig. 1 of the drawing caused deenergization of the heater 13. If, now, a small amount of hot water, say only a few quarts, is needed and is withdrawn, it is possible that the level of the incoming cold water, entering at the bottom of the tank, would be below member 39 but above say the upper end of arm 31.

The design, construction and adjustment of the assembly 27 is such that even though the expansion rod 49 and particularly its surrounding members were subject to cold water, it would not contract sufficiently to cause reengagement of contact arm 23 with contact arm 19 because of the fact that heat conducting rod 35 was still conducting enough heat from the hot water surrounding the upper end of the assembly 27 to prevent such reclosure of the thermal control switch for the heater.

Only when additional water, say to the extent of several gallons, is withdrawn from the tank so that the entire assembly 27 is subject to cold water, will the expansion rod 49 contract enough to cause engagement of contact arm 23 with contact arm 19 and reenergization of the heater 13.

It is, therefore, evident that the device embodying my invention provides a relatively simple thermally actuable assembly of elements having high heat conductivity to prevent frequent opening and closing of the heater control switch which will, of course, be found effective to reduce radio interference in the case where a radio instrument is operating at the time of making and breaking the engagement between the thermal heater control switch contacts.

Various modifications may be made in the system embodying my invention as herein shown and described and all such modifications clearly coming within the scope of the appended claims are to be considered as being covered thereby.

I claim as my invention:

1. In a water heating system for a hot water tank having an electric heater, a heater control switch and thermally-actuable means responsive to tank water temperature at two points only which points are spaced vertically from each other to cause closure of said switch and energization of the heater only after the withdrawal of enough hot water from the tank to cause the upper level of the entering cold water at the bottom of the tank to reach substantially the upper one of said two points.

2. In a water heating system for a hot water tank having an electric heater, a heater control switch and thermally-actuable means responsive to tank water temperature at two points only, which points are spaced vertically from each other to cause opening of said switch and deenergization of the heater only after the lower level of the hot water, as the water is being heated, reaches substantially the lower one of said two points.

3. In a water heating system for a hot water tank having an electric heater, a heater control switch and thermally-responsive means inside the tank engaged by the water and responsive to water temperature at two points only which points are spaced vertically apart an appreciable distance to cause energization of the heater only after the withdrawal of such an amount of hot water from the tank as will cause the upper level of the entering cold water at the bottom of the tank to reach substantially the upper one of said two points.

4. In a water heating system for a hot water tank having an electric heater, a heater control switch and thermally-responsive means for actuating said switch comprising an expansion rod extending into the tank, an enclosing means for said rod of high thermal conductivity at two points only, which points are spaced apart vertically an appreciable distance and engaged by the water in the tank, said thermally-responsive means being adapted to cause closure of said switch and energization of the heater only after the withdrawal of such a quantity of hot water from the tank as will cause the upper level of the cold water entering the tank to reach the upper of said two points.

5. In a water heating system for a hot water tank having an electric heater, a heater control switch and thermally-responsive means for actuating said switch comprising an expansion rod extending into the tank, an enclosing means for said rod of high thermal conductivity at two points only, which points are spaced apart vertically an appreciable distance and engaged by the water in the tank, said thermally-responsive means being adapted to cause opening of said switch and deenergization of the heater only after the lower level of the hot water, as the water is being heated, reaches substantially the lower one of said two points.

6. In a water heating system for a hot water tank having a single electric heater adjacent its lower end, a heater control switch and thermally-actuatable means responsive to tank water temperature at two points only, which points are near the lower end of the tank and are spaced vertically from each other to cause energization of the electric heater only after the withdrawal of enough hot water from the tank to cause the upper level of the entering cold water at the bottom of the tank to reach substantially the upper one of said two points.

7. In a water heating system for a hot water tank having a single electric heater adjacent its lower end, a heater control switch and thermally-actuable means responsive to tank water temperature at two points only, which points are near the lower end of the tank and are spaced vertically from each other to cause energization of the electric heater only after the withdrawal of enough hot water from the tank to cause the upper level of the entering cold water at the bottom of the tank to reach substantially the upper one of said two points and to cause deenergization of the electric heater when the level of the cold water in the tank is substantially below the lower one of said two points.

CLARK M. OSTERHELD.